United States Patent Office 3,338,677
Patented Aug. 29, 1967

3,338,677
BROOKITE FIBERS AND THEIR PREPARATION
Kenneth L. Berry, Hockessin, Del., assignor to E. I. du Pont de Nemours and Company, Wilmington, Del., a corporation of Delaware
No Drawing. Filed Sept. 7, 1966, Ser. No. 577,617
14 Claims. (Cl. 23—202)

ABSTRACT OF THE DISCLOSURE

Process for preparing fibrous titanium dioxide of the brookite crystalline structure from the hydrolysis of a molten mixture of an alkali metal hexafluorotitanate and an alkali metal halide in an atmosphere of water vapor and up to 90% of an inert gas.

Titanium dioxide fibers of the brookite crystalline structure in which the fiber cross section is less than 0.025 mm. and the length-to-width ratio is at least 6:1.

---

This application is a continuation-in-part of application Ser. No. 397,291, filed Sept. 17, 1964, and now abandoned.

This invention relates to titanium dioxide fibers having the brookite crystalline structure, and to their preparation.

Fibrous titanium dioxide, generally of the rutile type, has recently been prepared by metathesis of titanium tetrachloride and boric oxide and by oxidation of titanium halides. Because of the high refractiveness and reflectance for infrared, this fibrous product is particularly useful as a high-temperature thermal insulator. In addition, due to the fibrous nature and high flexural modulus, it is also useful as a reinforcing component for plastics, ceramics, cermets, and in paper and other fiber compositions. It can also be used as a filtering medium. Because of the diverse uses, new forms of fibrous titanium dioxides are desired, as well as processes for preparing them.

It has now been discovered that useful fibrous titanium dioxide of the brookite crystalline structure can be obtained by the hydrolysis of a molten mixture comprising alkali metal hexafluorotitanate and alkali metal halide at a temperature of 665 to 800° C., with steam in a uniformly heated reaction zone. Optionally, an initial amount of titanium dioxide may be added to promote the start of the fibrous crystal growth.

Hexafluorotitanates of any of the ordinary alkali metals, i.e., of lithium, sodium, potassium, rubidium, or cesium, can be used as the hydrolyzable reactants. Of these, potassium hexafluorotitanate ($K_2TiF_6$) is preferred on the basis of availability, ease of handling and good solubility in alkali metal halide melts. Concentrations of up to 50% by weight of alkali metal hexafluorotitanates in the melt can be employed, and concentrations in the 30–35% range are preferred as being optimum from the standpoint of balance between productivity and quality. Alternatively, the hexafluorotitanates can be formed in situ by dissolving titanium tetrafluoride directly in an excess of molten alkali halide.

The molten reaction medium may be formed of an individual alkali metal halide, e.g., sodium chloride, or of a mixture of alkali metal halides, e.g., the eutectic mixture of sodium chloride and potassium chloride. Suitable media are lithium fluoride, lithium chloride, potassium fluoride, potassium chloride, potassium bromide, sodium chloride, sodium fluoride, sodium bromide, sodium iodide, rubidium chloride, rubidium bromide, cesium fluoride, cesium chloride, cesium bromide, and the like. Sodium chloride is a preferred alkali metal halide because it forms a eutectic with the preferred $K_2TiF_6$ reactant. Although alkali metal fluorides can be used alone, it is preferred to use them in mixtures with other alkali metal halides in order to avoid high concentrations of fluoride in the melt, since molten alkali metal fluorides in high concentration react readily with titanium dioxide to form titanates.

An initial amount of titanium dioxide is usually added to the alkali metal fluorititanate-alkali metal halide mixture in order to avoid an induction period (due to insufficient saturation of the mixture with $TiO_2$ formed by the hydrolysis) before the start of crystal growth, to provide a mechanical support for fiber growth in the surface of the melt, and to prevent formation of multiple thin strata of growth. Preformed titanium dioxide amounting to 8 to 10% of the weight of alkali metal hexafluorotitanate, i.e., an amount sufficient to saturate the melt before starting the hydrolysis, is normally used for these purposes. However, it is not necessary to add preformed titanium dioxide. The above purposes can also be served through in situ formation of a saturating amount of titanium dioxide by preliminary heating of the alkali metal hexafluorotitanate in moist air at a temperature below its melting point, i.e., up to about 700° C., before adding it to the alkali metal halide medium.

The process can be carried out at temperatures in the range of 665 to 800° C., a temperature of 675° C., measured in the top center of the melt, being preferred as optimum. Temperatures in the lower portion of the operable range, i.e., 665° to 725° C., favor formation of fine fibers and minimize structural conversion of brookite to rutile. The rate of hydrolysis with simultaneous formation of fibrous brookite varies directly with the temperature and is also a direct function of the concentrations of water and alkali metal hexafluorotitanate and of the surface to volume ratio of the melt.

The time of reaction is not critical and may be varied within wide limits depending upon the amount of alkali metal hexafluorotitanate to be converted. Although times ranging from a few hours to several days can be employed, it is preferred to scale the process to a size suitable for optimum operation within about one day in order to avoid excessive change from fibrous to granular crystalline forms.

The process is usually carried out at atmospheric pressure and provision of equipment capable of withstanding pressures greatly in excess of atmospheric pressure is unnecessary. However, it is also possible to operate at pressures above or below atmospheric pressure. The pressure employed will generally be between about 0.5 and about 5 atmospheres.

Because of the corrosive nature of alkali metal halide melts, the process is carried out in a reaction vessel constructed of suitably resistant material, e.g., alumina ceramics or platinum. Platinum is preferred from the standpoint of thermal conductivity and of heat and corrosion resistance.

It is preferred to employ an atmosphere of 100% water vapor in the process for achievement of maximum rates of hydrolysis and to exclude air, which oxidizes HCl and chloride ions. The water vapor is preferably introduced as superheated steam. A rate of steam flow sufficient to provide good ventilation of the reactor is desirable for removal of hydrogen halide and metal halide vapors. If desired, an acid acceptor such as calcium oxide can be placed near the melt to capture hydrogen halide vapors and regenerate steam.

Although an atmosphere of 100% water vapor is preferred, it is not necessary. An atmosphere of water vapor and inert gases is operable. For example, the water vapor may be introduced with nitrogen, argon, and the like. In such atmospheres the percent of water vapor present can be 10 percent or more.

As the reaction is carried out fibrous titanium dioxide of the brookite crystalline structure forms in the central portion of the melt, while fibrous titanium dioxide of the rutile crystalline structure forms near the edges of the melt adjacent the walls of the reaction container. Since the change to the rutile structure occurs only near the zones of the melt adjacent the walls of the reaction vessel, it is important to minimize temperature gradients across the melt and the resultant convection currents within the melt. Such minimization may be accomplished by suitable control of batch size, furnace and reaction vessel shapes, and placement of the reaction vessel within the furnace. It is desirable that the temperature difference between the center and the outside of the melt be as small as possible, preferably not more than 30° C.

After the reaction is complete, the fibrous brookite titanium dioxide may be separated from the rutile structures by mechanical means since they occur in differently colored fractions of the melt.

After separation, the two fibrous titanium dioxide-containing melts are each treated with water to dissolve much of the alkali metal halide reaction medium and are extracted with hot water and aqueous hydrochloric acid to remove unchanged hexafluorotitanate and residual alkali metal halide. Alternatively, the alkali metal halide can be separated from the titanium dioxide fibers and crystals at elevated temperatures by decantation or filtration followed by washing the solid residue with hot water and aqueous hydrochloric acid. The titanium dioxide fibers in aqueous suspension are readily separated from any insoluble non-fibrous material by filtration, screening, elutriation, settling, decantation, and the like.

The brookite fibers of this invention which are formed in the process already described are square to rectangular in cross-section, having a ratio of cross-sectional dimensions of from about 1:1 to 3:1, a width of between about 0.001 to 0.025 mm., and a length to width ratio of at least 6:1. Ratios of 500:1 to 1000:1 have been observed. Fiber lengths of up to 1 cm. have been found.

The invention is illustrated in greater detail in the following examples.

Example 1

An intimate mixture of 65 g. of sodium chloride, 35 g. of potassium hexafluorotitanate and 3 g. of titanium dioxide in a 100 ml. round platinum dish having a flat bottom and a vertical side wall was placed in a vertical cylindrical furnace heated at about 700° C. Dry nitrogen gas was passed over the surface of the mixture by means of a bell-shaped fused-silica tube positioned above the dish. The mixture became a nearly complete melt in about 30 minutes, whereupon the nitrogen flow was stopped and superheated steam was passed through the delivery tube at a rate of 34 g./hr. for 6 hours while the furnace was controlled so that the temperature adjacent to the interior wall beside the dish was about 700° C., the gradient being such that the temperature at the center of the surface of the melt was about 675° C. The reaction was terminated by changing back to a flow of nitrogen and shutting off the heat. The dish was removed when the temperature dropped below 600° C. and was allowed to cool to room temperature in the open, after which the solidified reaction mixture was covered with water and let stand overnight. The resultant cake of crystalline material, about 76 mm. in diameter and 9.5 to 11.0 mm. thick, contained a centrally located nearly colorless disc about 50 to 60 mm. in diameter and 5.5 to 7.3 mm. deep which was composed of essentially parallel fibrous crystals perpendicular to the surface. The disc was surrounded by a cup-like formation of dark blue material in a salt matrix. The light-colored fibrous crystals were separated mechanically from the dark blue material; each fraction was extracted separately and successively by boiling water and 4 N aqueous hydrochloric acid; and the extracted fractions were separately dispersed by agitation, filtered, washed with water and air-dried.

The light colored fraction was obtained as a pad of felted fibers having a volume of about 20 ml. and a weight of 1.09 g. Individual fibers were quite flexible, ranged in length up to 2 mm., and were square to rectangular in cross-section with cross-sectional dimensions ranging from about .001 to .004 mm. The ratio of cross-sectional dimensions varied from 1:1 (square) to about 3:1 (rectangular). The fibers showed an X-ray diffraction pattern corresponding to that of brookite, and examination under a polarizing microscope showed them to be monocrystalline. A single brookite fiber was found to have an elastic modulus of $17 \times 10^6$ lb./sq. in., and measurements of tensile strength on individual fibers gave values up to about 200,000 lb./sq. in.

A sample of the light colored fibers retained the brookite structure after being heated 10 days at 750° to 800° C. but was changed to the rutile structure on being heated three hours at 1000° C.

The blue crystalline fraction was separated further by fractional sedimentation of a suspension in water. Crystals which remained in suspension after a brief settling period were isolated by decanting the suspension and then filtering it. A felted pad having a volume of about 10 ml. and a weight of 3.17 g. was thus obtained. The fibers in this sub-fraction corresponded to products having the rutile structure. The coarser subfraction of blue crystals comprised 6.34 g. of free-flowing non-felting material having a volume of about 5 ml. and corresponding to nonfibrous rutile.

Example 2

Example 1 was repeated except for a lower placement of the platinum dish in the furnace. The brookite fiber fraction comprised 1.86 g. of an excellently felted pad of 35 ml. volume containing somewhat longer and coarser fibers than the corresponding fraction of Example 1. The bulk of the fibers were 3 to 4 mm. long, the maximum length was 6 mm. and the cross-sectional dimensions were in the range of .001 to .010 mm. In addition, there was obtained 2.42 g. of rutile-type fibers and 7.14 g. of coarse non-fibrous rutile crystals.

Example 3

The procedure of Example 1 was followed except for use of a 300 ml. bowl-shaped platinum dish containing 162.5 g. of sodium chloride, 87.5 g. of potassium hexafluorotitanate and 8 g. of titanium dioxide and introduction of nitrogen and steam by means of an inverted T delivery tube positioned at one side of the furnace. The product in this instance contained no brookite-type fibers, 12.61 g. of rutile-type fibers in a felted pad of about 75 ml. volume, and 2.77 g. of coarse crystals. This example illustrates the importance, in the preparation of brookite fibers, of a large surface to volume ratio in the melt, and of shaping and positioning the inlet tube so as to provide a complete blanket of water vapor over the surface of the melt and to minimize the creation of strong convection currents.

Example 4

A batch of brookite fibers were prepared in accordance with the procedures set forth above. Representative portions were dispersed by stirring in collodion, and a drop of the dispersion, taken before settling could occur, was placed on a microscope slide. The samples were photographed and fiber length and width measurement taken.

Analysis revealed that the average fiber length was 0.32 mm., and the average width was 0.014 mm.

Additional analysis disclosed that the length-to-width distribution of the fibers was as follows:

| Cumulative Percent: | Minimum length-to-width ratio |
|---|---|
| 90 | 6 |
| 80 | 16 |
| 70 | 24 |
| 60 | 29 |
| 50 | 34 |
| 40 | 43 |
| 30 | 54 |
| 20 | 74 |
| 10 | 133 |

The most acicular fiber in this batch had a length-to-width ratio of 640:1; and the longest fiber here was 4.1 mm. long.

The brookite titanium dioxide fibers of this invention are particularly useful as a reinforcing component in ceramics; cermets; plastics such as molded, milled, or solvent-cast resins; paper, and other fiber compositions. One of the advantages in using these fibers for reinforcement in composite articles is the high strength and modulus inherent in the fibers. The fact that a large proportion of the fibers are monocrystalline favors a high degree of surface and internal perfection which leads to high strength. Tensile strength measurements on brookite fibers of Example 4 give an average strength of about $1 \times 10^6$ p.s.i. (modulus taken as $50 \times 10^6$ p.s.i.) with individual values as high as $3.6 \times 10^6$ p.s.i.

A second feature of brookite fiber, important to utility as a reinforcing component, is the high length to width ratio exhibited by a preponderance of the fibers. For good reinforcing action, this ratio should be at least 20:1 and it will be noted that more than 70% of the fibers referred to in Example 4 meet this criterion.

In preparing objects reinforced with brookite fibers, it is desirable to employ methods which avoid or minimize fiber breakage since such breakage reduces the effectiveness of reinforcement. In such methods as casting of molten fiber-containing mixtures or hand lay-up of fiber mats, yarns, or fabrics, breakage is not usually a problem and no special precautions are required. However, when articles are fabricated by extrusion, forging, pressing, or injection-molding, it is best to heat the composite to a temperature at which the matrix is in a fluid or semifluid condition before application of substantial pressure in order to avoid an objectionable degree of fiber breakage. For example, a sample of fibers of this invention was carefully mixed, to avoid breakage, with about an equal weight of a polyhexamethylene adipamide molding resin ("Zytel 101") in methanol. The resulting slurry was dried and molded to obtain tensile bars. The tensile strength of the reinforced bar was greater than that of an unreinforced "Zytel" standard bar.

Brookite fibers can be used for reinforcement of a variety of other organic plastics, including thermoplastics and thermosetting resins. Classes of suitable polymer matrices include vinyl polymers such as vinyl halides and vinyl esters, vinyl ethers; cellulose esters; polyamides; polyesters; silicone polymers; urea-formaldehyde resins; polymers of ethylenic hydrocarbons; esters, nitriles, amides, anhydrides and acid halides of alpha-methylene monocarboxylic acids, polyurethanes, polycarbonates and polyacetals.

Examples of specific polymers include polyethylene terephthalate, polystyrene, styrene-acrylonitrile copolymers, styrene-butadiene copolymers, polybutadiene, polyisoprene, polychloroprene, polyfluoroprene, polytetrafluoroethylene, polyvinyl acetate, polyvinyl butyrate, polyethylene, polypropalene, polyacrylonitrile, polymethylmethacrylate, polyisobutylene, polyvinyl fluoride, polyvinyl chloride, polyvinyl benzoate, polychlorostyrene, ethylene/propylene copolymers, butadiene/styrene copolymers.

Examples of the polymers that can be used are copolymers of ethylene with such vinyl monomers as vinyl acetate and vinyl chloride, polyvinyl alcohol, cyanoethylated polyvinyl alcohol, polyvinylidene fluoride, vinylidene fluoride/hexafluoropropylene copolymers, polyvinyl ethyl ether, polymethacrylonitrile, polyacrylamide, polymethacrylamide, polyethyl acrylate, polyethylenimine, polyethylene oxide, polyoxymethylene, polymethylene made by hydrogenation of carbon monoxide, polyhexamethyleneadipamide, polydecamethyleneadipamide, polyglycine, polyleucine, and other polypeptides, polycaprolactam, polypivalolactone, cellulose acetate, cellulose nitrate, cellulose propionate and cellulose acetate/butyrate copolymer.

It is often advantageous to employ coupling agents, such as organochromium complexes, silicones or titanium esters, to promote adhesion between fibers and matrix. Similarly, brookite fibers can be used for reinforcement of metals and alloys.

Orientation of the fibers in the compositions can be random in three dimensions or in two dimensions, or the fibers can be aligned substantially parallel to one another. The manner of alignment selected will depend in known manner on the properties desired in the final article. Orientation is achieved by known methods.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A process for preparing fibrous titanium dioxide of the brookite crystalline structure which comprises hydrolyzing a molten mixture comprising alkali metal hexafluorotitanate and alkali metal halide at a temperature of about 665 to 800° C. with a covering atmosphere of water vapor and from 0 to 90 percent inert gas in a uniformly heated reaction zone, and recovering said fibrous titanium dioxide.

2. The process of claim 1 wherein the alkali metal hexafluorotitanate is potassium hexafluorotitanate.

3. The process of claim 1 wherein the alkali metal halide is sodium chloride.

4. The process of claim 1 wherein the atmosphere is 100 percent water vapor.

5. The process of claim 1 wherein the alkali metal hexafluorotitanate comprises up to 50 percent by weight of the molten mixture.

6. The process of claim 5 wherein the atmosphere is provided by a continuous stream of superheated steam.

7. The process of claim 6 wherein the alkali metal hexafluorotitanate is potassium hexafluorotitanate and the alkali metal halide is sodium chloride.

8. The process of claim 6 wherein the potassium hexafluorotitanate comprises 30–35 percent by weight of the total mixture.

9. The process of claim 6 wherein said molten mixture contains, additionally, titanium dioxide in an amount up to saturation.

10. The process of claim 9 wherein the alkali metal hexafluorotitanate is potassium hexafluorotitanate.

11. The process of claim 10 wherein the alkali metal halide is a eutectic mixture of sodium chloride and potassium chloride.

12. Titanium dioxide fibers of the brookite crystalline structure in which the fiber cross-section is less than 0.025 mm. and the length to width ratio is at least 6:1.

13. Titanium dioxide fibers of claim 12 being square to rectangular in cross-section and having a ratio of cross-sectional dimensions of from about 1:1 to 3:1.

14. Titanium dioxide fibers of claim 12 wherein the length to width ratio is at least 20:1.

References Cited

UNITED STATES PATENTS

| | | | |
|---|---|---|---|
| 2,980,510 | 4/1961 | Berry. | |
| 3,012,857 | 12/1961 | Pease | 23—305 X |
| 3,030,183 | 4/1962 | Berry | 23—202 |
| 3,065,091 | 11/1962 | Russell et al. | 106—55 |
| 3,241,928 | 3/1966 | Pease | 23—305 |
| 3,252,814 | 5/1966 | Russell et al. | 106—57 |
| 3,270,109 | 8/1966 | Kelsey | 23—202 X |

OTHER REFERENCES

D. L. Deadmore et al.: "Stability of Inorganic Fluorine-Bearing Compounds: II, Complex Fluorides," J. Am. Ceram. Soc., 45 (1962), pp. 120–122.

Rao and Yoganarsimhan: "Studies on the Brookite-Rutile Transformation," Trans. Faraday, Soc., 57 (1961), pp. 504–507.

"Titanium," book by J. Barksdale, p. 57, 1949 ed., Ronald Press Co., New York.

OSCAR R. VERTIZ, *Primary Examiner.*

EDWARD STERN, *Examiner.*